Feb. 3, 1953      J. E. NORWOOD      2,627,089
METHOD FOR TALC CRAYON PRODUCTION
Filed Feb. 4, 1949
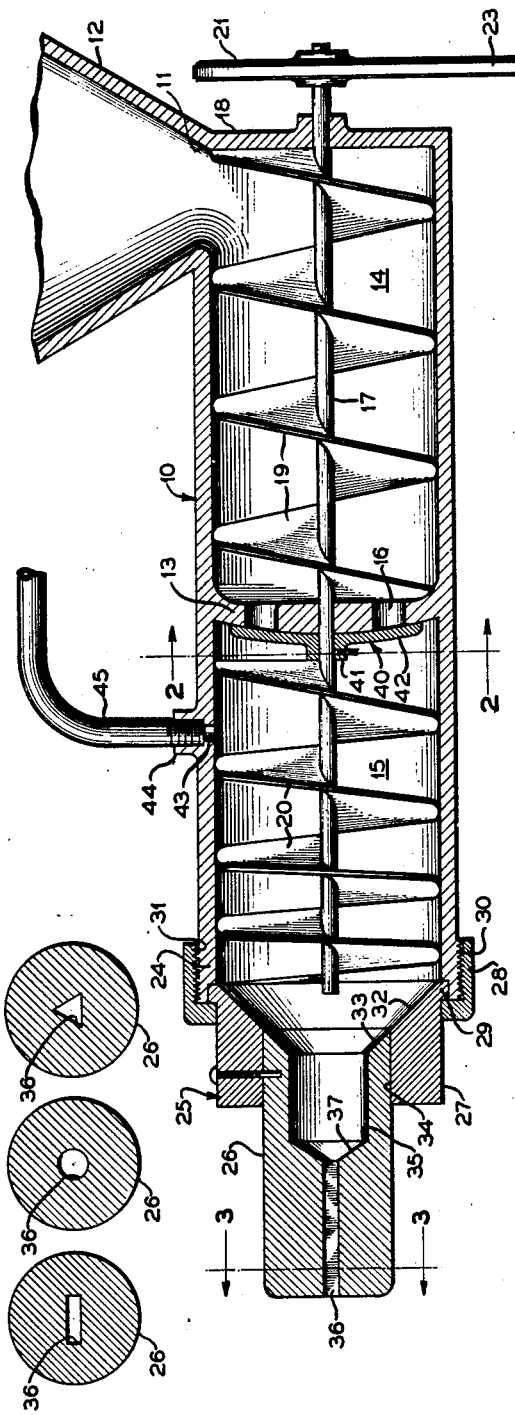
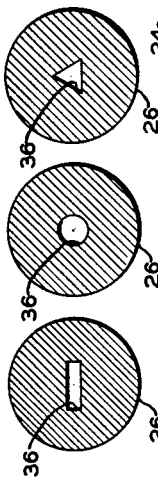
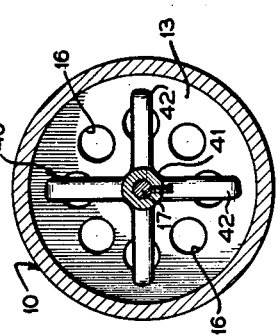
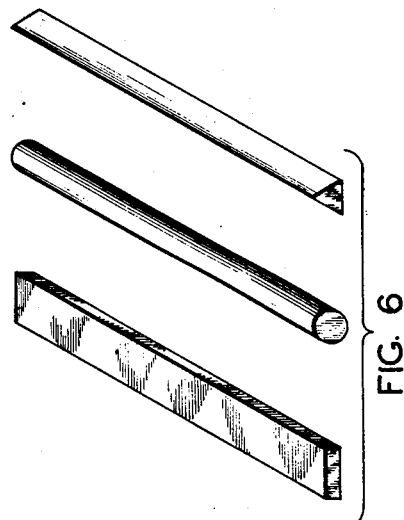
INVENTOR.
J. E. NORWOOD
BY
A. Yates Dowell
ATTORNEY Patented Feb. 3, 1953

2,627,089

UNITED STATES PATENT OFFICE 2,627,089

METHOD FOR TALC CRAYON PRODUCTION

Jack E. Norwood, Raleigh, N. C.

Application February 4, 1949, Serial No. 74,640

5 Claims. (Cl. 18—55)

This invention relates to plastics and more particularly to the production of a marking pencil or crayon from raw material of the class commonly known as steatite or talc. Certain other substances, such as pyrophyllite and vermiculite, having physical properties similar to talc may be used in its stead, and their use is within the scope of the invention.

Talc is a mineral formation found in various parts of the country in a wide range of qualities. The finer quality, pure soapstone, has sufficient strength that it may be sawed into sheets say from 1/8 to 1/4 inch thick and these into pencils about 1/2 inch wide and of a convenient length, as for example 5 or 6 inches. The poorer quality talc crumbles or scales when subjected to sawing.

Talc is also cut into blocks and other forms such as a disc. The uses of these talc forms are numerous, including crayons for marking cloth and metal, particularly that which is to be subjected to high temperature. The blocks are used by sculptors for carving purposes and may be used as a refractory brick. The pulverized talc of the finest quality is used for cosmetics and the like.

Because of the low strength and tendency to scale of the lower quality talc, it is not well adapted for use as a crayon or art block, and therefore much of the available talc deposits of the country are unusable for this purpose and as a result, the demand for high quality talc is not satisfied, with the result that inferior marking crayons are oftentimes all that are commercially available.

Talc has been mixed with sodium silicate in the past and extruded to form a pencil or the like. Previously, however, some additional substance such as calcium carbonate has been added to the composition to impart strength to the final product. It has been found that calcium carbonate reacts with certain sodium silicates but not with others and although the prior art discloses the use of sodium silicate broadly, its strength is not defined so that it is not apparent what the properties of the resulting products were.

Certain disadvantages accompany the use of a substance such as calcium carbonate which is widely used as a flux. If used in a pencil to mark metal which is to be subjected to the high temperature of a cutting torch or the like, the pencil line would be destroyed by the fluxing action of the calcium carbonate on the magnesia.

Accordingly, the desired range of $Na_2O$ to $SiO_2$ in the sodium silicate has been found to be on the order of 1:3.25–3.9. Using a sodium silicate of this strength other substances such as calcium carbonate are unnecessary and, in fact, undesirable. Furthermore, calcium carbonate does not react appreciably with solutions of sodium silicate on the order of $Na_2O.4SiO_2$, as here, at atmospheric pressure and temperatures.

Accordingly, it is an object of the present invention to provide a process by which inferior talc may be employed to produce a marking pencil or other extruded member whose strength is substantially as great as that of a pencil produced from the higher quality talc.

A further object of the invention is the provision of apparatus for extruding a plastic composition of talc.

These and other objects of the invention will become apparent from the following description taken together with the accompanying drawings, wherein:

Fig. 1 is a section through an extrusion apparatus constructed in accordance with the present invention;

Fig. 2, a section on the line 2—2 of Fig. 1;

Fig. 3, a section on the line 3—3 of Fig. 1;

Figs. 4 and 5, modified forms of the device shown in Fig. 3; and,

Fig. 6, perspectives of pencils produced from the nozzles shown in Figs. 3, 4, and 5.

The talc which is used in my process is first pulverized so that about 60% will pass through a 270 mesh screen and about 100% through a 200 mesh screen. It is necessary that the talc be finely ground, as the strength of the product depends on the fineness of the particles of the raw material. The talc may be of fine or poor quality and may be foliated talc, steatite or soapstone, French chalk, or indurated talc. That of lower quality contains various impurities which are removed by a flotation process or the like.

In order to make a plastic mass of the talc, a binder, preferably sodium silicate, commonly known as water glass, is added to the powdered talc and the two are thoroughly mixed to form a homogeneous mass. The sodium silicate is preferably of about 30° to 42° Baumé, and a preferred mixture is 2.16 gms. of talc per c. c. of sodium silicate.

The mixture is then extruded or otherwise formed and then subjected to a temperature of 120° F. for 12 hours, following which the temperature is raised to 240° F. for an additional 48 hours. The last two steps dry and harden the material and without swelling and the like.

The talc may be prepared in its natural color or may be tinted if desired by mixing certain organic dyes therewith to provide pencils, blocks or marking instruments of various colors. For use with the composition a dyestuff which is soluble in the alkaline solution is necessary and also one which does not react with the strong silicate solutions to form a salt which is useless for coloring. The dyes which have been found preferable are: Rhodamine B extra, Safranine T extra concentrated, Victoria Green, small xls., Auramine concentrated, Tantrazine concentrated, Methylene Blue ZX, Chrysoidine GN. Some other dyes which may be employed are: fluorescein, eosin colors, and alkaline tannates.

For carrying out the process, the apparatus to be described has been found particularly advantageous, although it is understood that the invention is not limited to the particular apparatus shown. The apparatus includes a substantially cylindrical body 10 having an opening 11 near one extremity with a funnel 12 positioned to guide material into the opening.

Approximately midway of the cylinder is a central wall 13 dividing the cylinder into rear and forward chambers 14 and 15, respectively, the wall having a plurality of spaced apertures 16, by means of which material may pass through one chamber into the other. A shaft 17 is journalled in an end wall 18 of the cylinder and the wall 13 dividing the cylinder. A feed screw 19 is carried by the shaft 17 in the portion 14 of the cylinder and another screw 20 is carried by the shaft in the forward portion 15 of the cylinder. The threads of the screw 20 are spaced more closely near the nozzle, to be described, in order to compress the material as it enters the nozzle.

The shaft extends beyond the wall 18 of the cylinder and has a fly wheel 21 or pulley positioned thereon, which is adapted to be driven by a motor 22 by means of a belt drive 23.

The end 24 of the cylinder has the nozzle assembly 25 secured thereto, which includes nozzle 26, a base portion 27, which receives the nozzle 26, and a cap 28 which engages a flange 29 of the base 27 to secure the nozzle, and has threads 30 in engagement with corresponding threads 31 on the outside of the end of the cylinder.

The base 27 and the nozzle 26 have internal bores with frusto-conical portions 32 and 33, the portion 33 being a converging extension of the portion 32. The axial bore 34 of the base 27 receives the rear extremity of the nozzle 26 and the main bore 35 of the nozzle extends substantially therethrough and is reduced to a relatively small bore 36 at its extremities by a frusto-conical portion 37.

The bore 36 may be of any desired cross section, Figs. 3, 4 and 5 illustrating rectangular, circular, and triangular, respectively.

A wiper 40 is attached to the shaft 17 next to the central wall 13 within the chamber 15 and comprises a hub 41 to which a plurality of arms 42 are attached and which extend over the aperture 16 in the wall. The arms 42 are curved to the configuration of the wall surface and are positioned in intimate contact therewith so that as they rotate, the plastic material received through the apertures 16 is sliced therefrom in substantially disc or pellet form.

The portion of the cylinder 10 defining its forward portion 15 has an aperture 43 in its upper portion near the wall 13 with an extension 44 to which a conduit 45 is attached. The conduit connects the interior of the forward portion of the cylinder with suitable vacuum apparatus which draws air and moisture from the cylinder and the material therein.

In the operation of the apparatus, the plastic mixture of talc and sodium silicate is introduced in the cylinder through the funnel 12 and is moved axially with the cylinder by the screw 19 which is rotated by the shaft 17. As the material packs in the cylinder, it is forced out through the apertures 16 into the forward chamber 15, the wall 13 sealing the chamber 15 from the chamber 14. As it enters the chamber 15, the arms 42 of the wiper 40 which rotate with the shaft 17 sever short lengths from the material and these are conveyed by the thread 20 to the nozzle assembly 25. As the material moves toward the nozzle it is compacted into a uniform mass, and air and moisture are removed and drawn out through the conduit 45, thus eliminating bubbles and air spaces in the material. The material is then forced out through the nozzle opening 36 and on to a platform or rack. It may then be cut or formed into desired lengths and is then placed in an oven or subjected to heat treatment and drying as described above.

The extruded products may be of the forms shown in Fig. 6, and are adapted to be pointed or sharpened for use by welders for marking metal or for textile workers for marking fabric. The shapes may also be sliced off into relatively thin discs of the type employed by tailors.

The invention is not limited to the extrusion of the talc composition in plastic form but includes pressing a mixture to form blocks and other shapes. In carrying out this process the amount of sodium silicate that is used in proportion to that of the talc is substantially reduced so that the moisture content is very low. Instead of 2.16 grams of talc per c. c. of sodium silicate, it has been found that about 4.5 is preferred. After the substances are thoroughly mixed together, it is subjected to a pressure of approximately 2600 pounds per square inch, following which it is dried at about 240° F., for twenty-four hours, the time varying in accordance with the size and mass of the article, and the relative humidity of the air.

For some applications it has been found desirable to provide a waterproof skin or layer for the crayon or block, and the invention contemplates means for producing this. The chemical substance used is a water soluble salt, such as zinc chloride or the like. It may be applied to the crayon by passing the extruded shape from the nozzle through the salt solution; the block may be treated after it is pressed. The salt solution reacts with the outside layer of the sodium silicate in the product to form an insoluble zinc silicate. The depth of the penetration may be regulated by varying the time which the product is in contact with the salt solution. It is preferred that the penetration be slight because of the susceptibility to subsequent fluxing under high temperature of the portion reacting.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. The method of making a composition pencil, consisting of the following procedure: pulverizing talc to at least 200 mesh, removing substantially all the impurities therefrom, adding sodium silicate of about 30°–42° Baumé in the proportion of about 2.16 grams of talc per c. c. of sodium silicate, mixing the substances thoroughly, extruding the composition in a length of the desired cross-section, dividing the length into pieces of the desired size, subjecting the pieces to a drying atmosphere at a temperature of about 120° F., for approximately 12 hours, and raising the temperature to 240° F., for approximately 48 hours to form a composition pencil having the desired properties.

2. The method of making a composition pencil, consisting of the following procedure: pulverizing talc to at least 200 mesh, removing substantially all the impurities therefrom, adding sodium silicate of about 30°–42° Baumé in the proportion of about 2.16 grams of talc per c. c. of sodium silicate, mixing the substances thoroughly, extruding the composition in a length of the desired cross-section, dividing the length into pieces of the desired size, and subjecting the pieces to drying to form a composition pencil having the desired properties.

3. The method of making a composition pencil, consisting of the following procedure: pulverizing talc to at least 200 mesh, removing substantially all the impurities therefrom, adding sodium silicate in the proportion of about 2.16 grams of talc per c. c. of sodium silicate, mixing the substances thoroughly, extruding the composition in a length of the desired cross-section, dividing the length into pieces of the desired size and subjecting the pieces to drying to form a composition pencil having the desired properties.

4. The method of making a composition block, consisting of the following procedure: pulverizing talc to at least 200 mesh, removing substantially all the impurities therefrom, adding sodium silicate in the proportion of about 4.5 grams of talc per c. c. of sodium silicate, mixing the substances thoroughly, forming the composition into a block at a pressure of about 2800 pounds per square inch and subjecting the block to a drying atmosphere of about 240° F. for approximately 24 hours to form a marking block having the desired properties.

5. The method of making a composition writing instrument consisting of the following procedure: pulverizing talc to at least 200 mesh, removing substantially all the impurities therefrom, adding sodium silicate in the proportion of approximately 2.16–4.5 grams of talc per c. c. of sodium silicate, mixing the substances thoroughly, forming the composition into a predetermined configuration under pressure, said pressure being sufficient only to produce a coherent writing instrument, and drying it to form a writing instrument having the desired properties.

JACK E. NORWOOD.

REFERENCES CITED

The following references are of record in the file of this patent:

UNITED STATES PATENTS

| Number | Name | Date |
| --- | --- | --- |
| 117,084 | Lanstrom | July 18, 1871 |
| 419,657 | Gesner | Jan. 21, 1890 |
| 1,131,463 | Berry | Mar. 9, 1915 |
| 1,614,526 | Lambie et al. | Jan. 18, 1927 |
| 1,922,473 | De La Roche | Aug. 15, 1933 |
| 1,964,266 | McElroy et al. | June 26, 1934 |
| 2,195,587 | Snell | Apr. 2, 1940 |